United States Patent [19]

De Conto et al.

[11] Patent Number: 4,495,633
[45] Date of Patent: Jan. 22, 1985

[54] PROCESS AND APPARATUS FOR THE DIMENSIONAL AND NON-DESTRUCTIVE CONTROL OF A HOLLOW MEMBER

[75] Inventors: Pierre De Conto, Chevigny Saint Sauveur; Raymond Guipont, Venarey-les-Laumes, both of France

[73] Assignee: Commissariat a l'Energie Atomique, Paris, France

[21] Appl. No.: 419,476

[22] Filed: Sep. 17, 1982

[30] Foreign Application Priority Data

Sep. 23, 1981 [FR] France .................. 81 17927

[51] Int. Cl.³ .............................................. G03B 41/16
[52] U.S. Cl. ............................................ 378/55; 378/59
[58] Field of Search ............................. 378/59, 58, 55

[56] References Cited

U.S. PATENT DOCUMENTS

| 2,702,864 | 2/1955 | McKee . | |
|---|---|---|---|
| 4,038,550 | 7/1977 | Wassen | 378/59 |
| 4,078,180 | 3/1978 | Green | 378/59 |
| 4,311,905 | 1/1982 | Ries | 378/59 |

FOREIGN PATENT DOCUMENTS 1320483  4/1962  France .
1424611 12/1964  France .

*Primary Examiner*—Craig E. Church
*Attorney, Agent, or Firm*—Oblon, Fisher, Spivak, McClelland & Maier

[57] ABSTRACT

The invention relates to a non-destructive, dimensional control process and apparatus with respect to a hollow member.

The apparatus comprises means making it possible to hold and position the member, a source which can be introduced into the member so as to emit gamma radiation in the direction of the inner surface of the wall of said member. A detector can be positioned outside the member, so as to detect the gamma radiation traversing the wall of said member. In addition, means are provided making it possible to effect a relative displacement between the assembly, constituted by the source and the detector, and the member in such a way that the wall profile of the latter is followed.

9 Claims, 4 Drawing Figures

PROCESS AND APPARATUS FOR THE DIMENSIONAL AND NON-DESTRUCTIVE CONTROL OF A HOLLOW MEMBER

BACKGROUND OF THE INVENTION

The present invention relates to an apparatus for the non-destructive, dimensional control of a hollow member. It in particular makes it possible to carry out dimensional controls of machined, hollow members, whose cavity is inaccessible to conventional mechanical means, such as sensors or comparators. It makes it possible to determine the thickness of the wall of said members at any point of their surface.

At present, this type of dimensional control of a machined hollow member is performed by means of ultrasonics. Due to the fact that the transit time of the ultrasonics, having a given velocity, through the wall of a member is a function of the wall thickness, the measurement of this transit time makes it possible to reciprocally deduce therefrom the thickness of the said wall. This ultrasonic control process firstly consists of investigating an average ultrasonic propagation velocity in the wall of the member which it is wished to check, so as to obtain wall thickness values identical to those given by a mechanical means (said measurement taking place on a standard half-member due to the inaccessibility of the cavity to the comparator), then carrying out measurements based on this average velocity. However, the errors regarding the thickness of members eresulting from this method are relatively high, i.e. ±0.1 mm for members having a thickness between 5 and 10 mm. This is due to the fact that the production processes of a member lead to structural variations between the individual areas of the member leading to a dispersion of the ultrasonic velocity. The average ultrasonic velocity adopted is consequently not very significant in the areas of the member where there is a high velocity. dispersion.

The ultrasonic control or inspection process which is easy and inexpensive to perform, in most cases makes it possible to determine the thickness of the wall of a machined member, in view of the permitted thickness tolerances, however, it cannot be used for members which are to serve as standards, as a result of the limited accuracy of the measurements.

BRIEF SUMMARY OF THE INVENTION

The present invention is directed at a non-destructive, dimensional control process for a hollow member making it possible to determine with a higher degree of precision than that supplied by the ultrasonic control process, the thickness of the wall of such a member.

The invention is based on the analysis by absorptiometry of gamma radiation, which consists of the measurement of the transmission, by a material, of gamma radiation from radioactive sources.

If $I_0$ is the intensity of a gamma beam perpendicularly striking an absorbing material of thickness x and if $\mu$ is the linear absorption coefficient of the material, the intensity I of the beam transmitted by the material i.e. the intensity of the beam which has not interacted with the material during the passage of the beam through it, is given by the equation:

$$I = I_0 e^{-\mu x}$$

The application of this principle makes it possible to measure the thickness x of the material in accordance with the equation $$x = (1/\mu)\ln(I_0/I)$$

The determination of x becomes more accurate as the number of parameters linked with the measurement is reduced. Thus, $\mu$ is a constant for a particular material and a particular energy and I and $I_0$ are only functions of the distance between the source and the detector.

More specifically, the present invention relates to a process for the non-destructive, dimensional control of a hollow member, wherein the inner surface of the wall of the member is exposed to gamma radiation emitted by a source located within the member, wherein the gamma radiation passing through the wall of the member is detected by means of a detector positioned outside the member and wherein there is a relative displacement between the assembly formed by the source and the radiation detector and the member, so as to follow the wall profile of the member.

This control process makes it possible to very accurately determine the thickness of the wall of a hollow member, bearing in mind that this type of control is independent of the minor variations of the structure of the member which is being controlled.

According to a preferred embodiment of the process according to the invention, the relative displacement between the assembly and the member to be controlled is carried out in such a way that the distance between the source and the detector remains constant throughout the said displacement. In this embodiment, the thickness x of the wall of the member is now only dependent on the absorption coefficient $\mu$ of the material forming the member to be controlled or inspected. The measurement of x can easily be carried out in a very accurate manner.

According to another preferred embodiment of the process according to the invention, the relative displacement between the assembly and the member to be controlled is carried out in such a way that the detected radiation is constantly normal to the wall of the member. Preferably, the displacement is carried out step by step.

The invention also relates to an apparatus for the non-destructive, dimensional control of a hollow member, wherein it comprises means making it possible to hold and position the member, whereby a source can be introduced into the member so as to emit gamma radiation in the direction of the inner surface of the wall of said member, whereby a detector can be positioned outside the member, so as to detect the gamma radiation liable to traverse the wall of said member, and means making it possible to carry out a relative displacement between the assembly formed by the source and the radiation detector and the member, so as to follow the wall profile of the said member.

According to a preferred embodiment of the apparatus according to the invention, the displacement means comprise, when the member to be inspected has a rectilinear wall in section, means making it possible. to simultaneously displace the source and the detector parallel to the said rectilinear wall.

According to another preferred embodiment of the apparatus according to the invention, when the member to be controlled has in section a wall in the form of a circular arc, the source is maintained in the centre of said arc and the displacement means comprise means making it possible to displace the detector along a circular arc having a larger radius and centered on the source.

According to another preferred embodiment of the apparatus according to the invention, the apparatus also comprises a support for the source which can be moved between a measurement position and a retracted position, a support for the detector and means making it possible to automatically join together these two supports, when the source support is in the measurement position.

According to another preferred embodiment of the apparatus according to the invention, the detector is a cadmium telluride crystal.

According to another preferred embodiment of the apparatus according to the invention, it also comprises means making it possible to automatically control the means permitting the relative displacement between the assembly and the member to be inspected, said displacement being performed in a stepwise manner.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
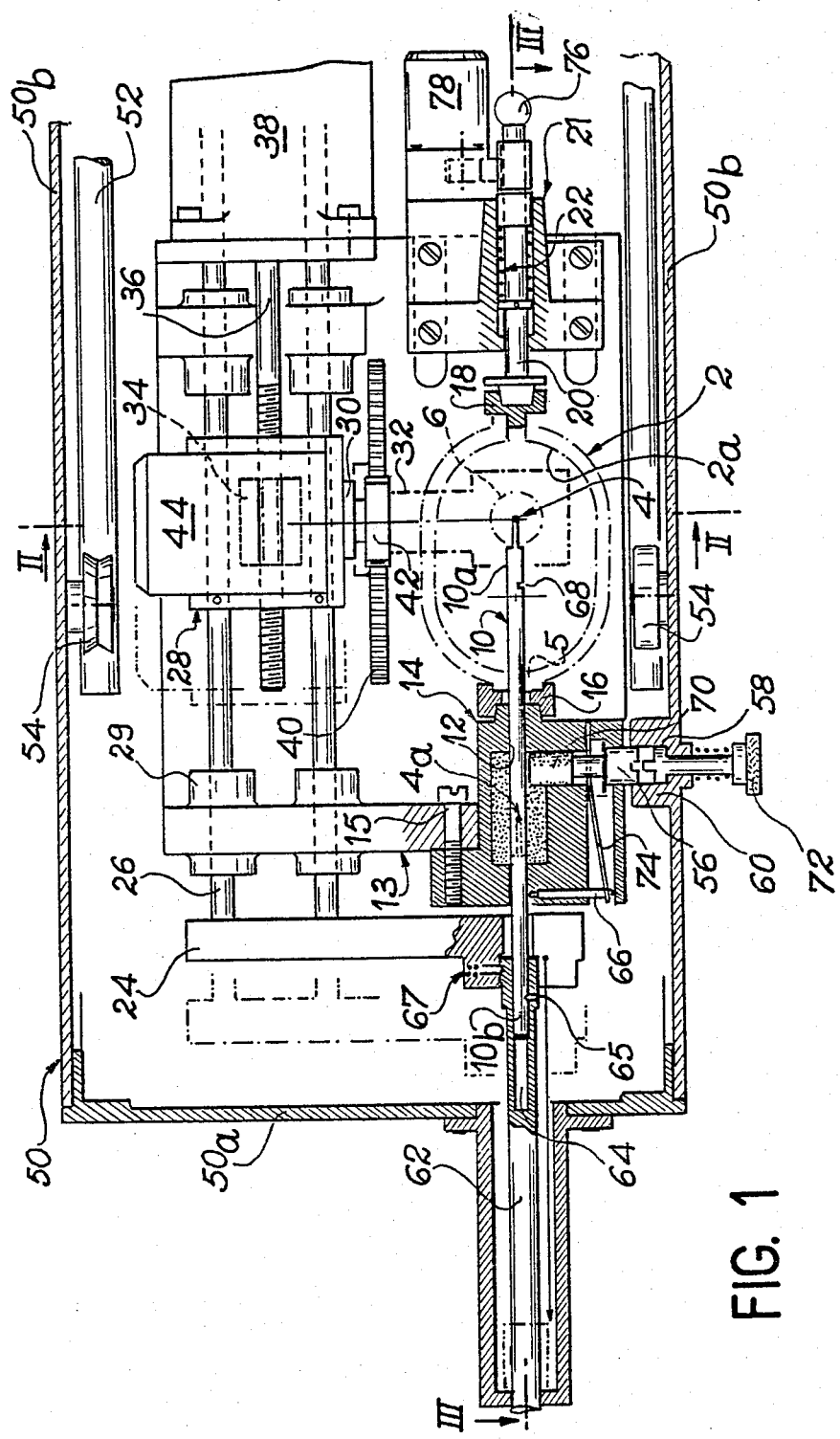
FIG. 1 diagrammatically, a plan view in section of the inspection or control apparatus according to the invention.

With reference to the various drawings, the control process according to the invention consists of exposing the inner surface 2a of the wall of a hollow member 2 to gamma radiation emitted by a radioactive source 4, which is e.g. cylindrical, which has been previously introduced into the member 2 via an orifice 5. The gamma radiation, after traversing the wall of the member, is then detected by means of a detector 6, preferably constituted by a cadmium telluride crystal and which is placed within the member. The assembly constituted by the source and the detector can be displaced relative to the member in such a way as to follow the profile thereof. The signal emitted by the detector for a given area of the surface of the member is a function of the thickness of the wall of the hollow member in the same area.

In order to very accurately define the area of the member which it is desired to inspect and consequently determine at any point of its surface the wall thickness, detector 6 can be coupled to a collimator 8 (FIGS. 2 and 3) fixed to the detector in such a way that it can be positioned between the detector and the member to be controlled.

Moreover, in order to simply and accurately determine the thickness of the wall of the member, within a given area, the displacement of the source - detector assembly is carried out in such a way that the detected gamma radiation is constantly normal to the wall of the member and in such a way that the distance between the source and the detector remains constant throughout the measuring time.

Thus, although gamma radiation detection in a direction oblique with respect to the normal to the wall of the member can be envisaged, it would necessitate making corrections to the measurement and as a result the thickness of the area being controlled might be determined with reduced accuracy.

In the same way, although gamma radiation detection can be considered with a source - detector distance varying according to the areas of the member being controlled, it requires the use of a calibration for each value of the source detector distance and this can lead to imprecisions in the determination of the wall thickness of the member. The calibration consists of determining for each measurement, the value of intensity $I_o$ of the gamma beam emitted by the source. The use of a constant source - detector distance throughout the control of the member consequently makes it possible to simplify said control, determination of $I_o$ only taking place once. In addition, it makes it possible to more accurately determine the thickness of the member wall, because the measurement is now only a function of the absorption coefficient of the material forming the member.

As shown in the drawings, source 4 is fixed to one of the ends 10a of a rod 10, which can slide in a bore 12 made in a detachable shielded block 14. Block 14 made for example from lead and which can be covered with a layer of steel, is fixed to a frame 13 by means of screws such as 15. The face of said block 14, from which extends the end 10a of the rod, carries a centering member 16, to which is applied one of the ends of the member to be inspected. The member is kept in the measuring position by another centering member 18 applied against the member to be inspected, e.g. using a cylindrical part 20. Part 20 can also slide and turn in a bore made in a support 21 fixed to frame 13. This cylindrical part 20 is engaged with the member by a compression spring 22. The fixing of support 21 of cylindrical part 20 to frame 13 can make it possible to position the support in a regulatable manner as a function of the size of the member.

The other end 10b of rod 10 carrying source 4 is mounted on a movable arm 24 integral with two guidance columns 26 parallel to rod 10 and able to slide in bearings 29 of frame 13. Columns 26 carry a carriage 28, provided with a shaft 30 orthogonal to columns 26 and on which is mounted a part 32 serving as a support for detector 6.

The displacement of carriage 28 is controlled in stepwise manner by means of a nut 34 mounted on the latter and in which is received a threaded rod 36, which can be rotated by means of a geared motor 38 carried by frame 13.

The displacement of the assembly constituted by carriage 28, columns 26, are 24 and rod 10 makes it possible to simultaneously displace the source and the detector along two straight lines parallel to the direction defined by columns 26. This makes it possible to control members having a cylindrical or planar wall. Moreover, the simultaneous displacement of the source and the detector makes it possible to retain a constant distance between the source and the detector and to keep the source and detector in a position permitting the detection of the gamma radiation transmitted by the wall along the normal to said wall.

Figure 2:
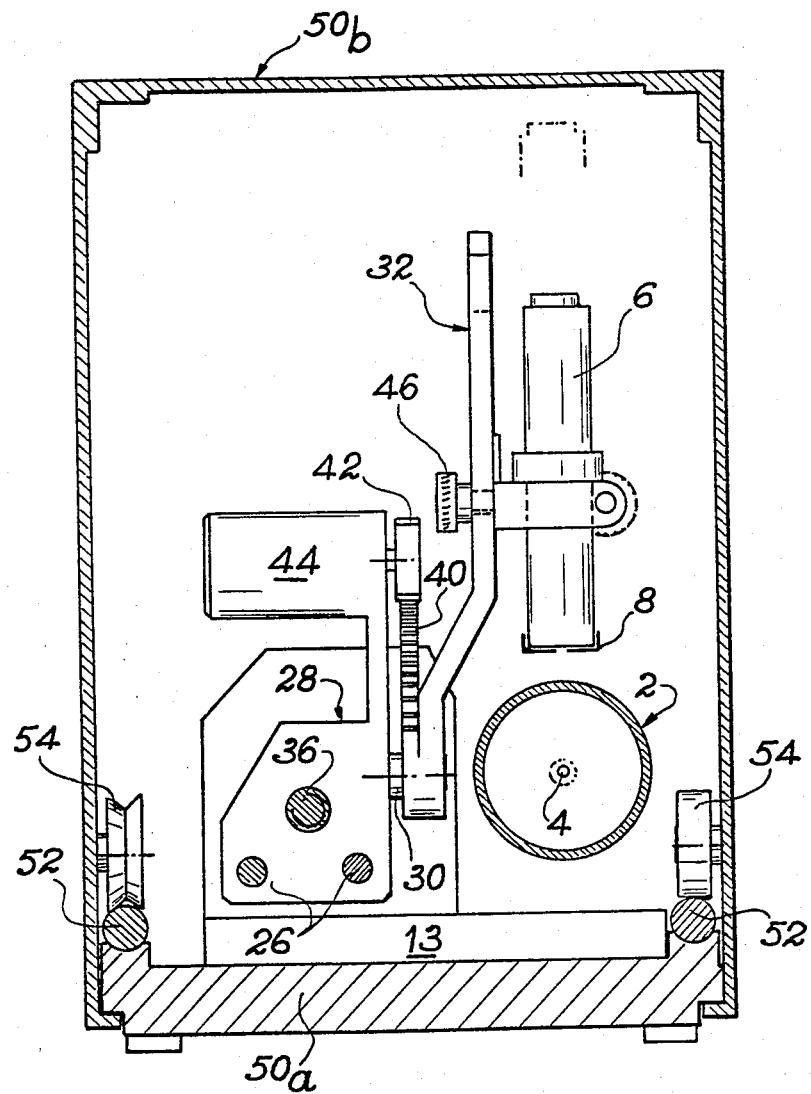
FIG. 2 diagrammatically, a sectional view along plane II—II of FIG. 1.

In the case of a member having in section a wall in the form of a circular arc (e.g. a hemispherical or spherical member), the control of the member takes place by keeping source 4 at the centre of said arc and by displacing detector 6 along a circular arc having a larger radius centered on the source. This displacement is performed by a toothed sector 40 (FIG. 3) fixed to shaft 30 and to part 32 and on which engages a pinion 42 rotated in stepwise manner by means of a geared motor 44 carried by carriage 28 (FIG. 2). The shaft of toothed sector 40 passes through source 4, when the latter is located in the member.

In order to permit the adjustment of the distance separating source and detector, the latter is fixed to part 32 by a milled screw 46 traversing a slot 47 formed in part 32. In order to know this distance, a slider 48 can be provided on part 32.

Figure 3:
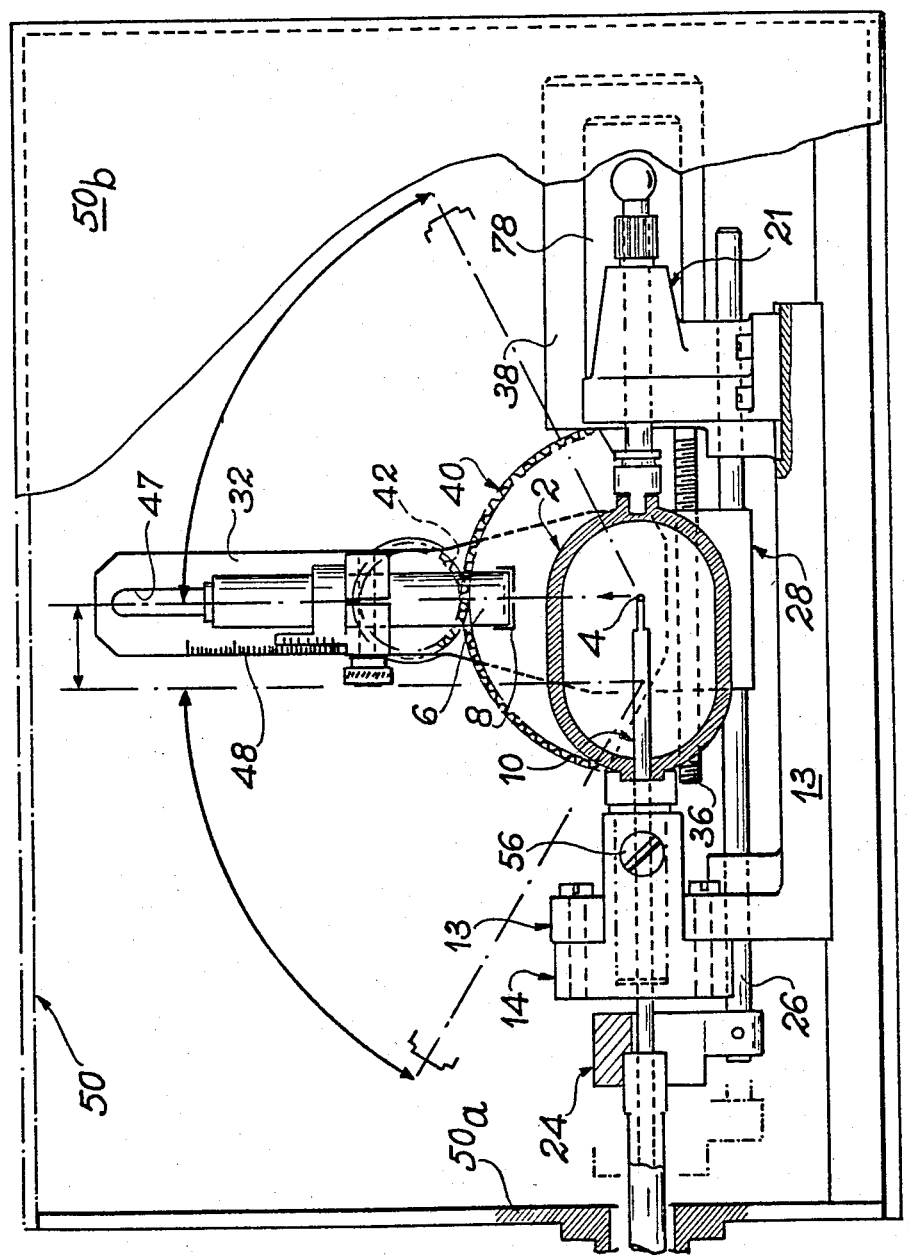
FIG. 3 diagrammatically, a side view in section along plane III—III of FIG. 1.

The complete apparatus is contained in an enclosure 50 ensuring the biological protection of personnel. This enclosure is constituted by a fixed part 50a defining two faces of the enclosure and a detachable part 50b defining the other faces. Frame 13 is fixed to one of the faces of the fixed part 50a, as illustrated in FIGS. 2 and 3. The mobility of part 50b is ensured by rails 52 carried by fixed part 50a and on which roll rollers 54, whose spindles are integral with the detachable part of the enclosure. In the measuring position (enclosure closed), the detachable part 50b is rendered integral with the fixed part 50a by means of a system constituted by a screw 56 mounted on the shielded block 14 and which is placed in a recess 58, made in an expanded portion 60 of the detachable part 50b.

When it is necessary to carry out handling operations, such as the fitting of the member to be controlled, source 40 can be retracted in position 4a by retracting rod 10 into block 14, using a rod 62 provided with a bore 64 into which is introduced rod 10. A ball-type system 64 makes it possible to join together rods 10 and 62. The installation of the source in the measuring position is carried out by means of a ball-type system 67, positioned between rod 62 and arm 24.

The source is maintained in the retracted position 4a, e.g. by means of a lug 66 sliding in block 14 perpendicular to rod 10 and is then positioned in a notch 68 in rod 10. In the retracted position of the source, radiation protection is ensured by means of a plug 70 enabling the blocking of bore 12 in block 14. The obstruction of this bore by plug 70 is ensured by screw 56, which can be screwed by means of a screwdriver 72 positioned in recess 58.

Moreover, the screwing of this screw ensures the disengagement of the detachable part 50b from the fixed part 50a of the protective enclosure, as well as the positioning of lug 66 in notch 68 by action on an antagonistic spring leaf 74. This system prevents the opening of the enclosure, when the source is outside the shielded block 14.

A description will now be given of the use and operation of this control apparatus.

The first stage consists of placing the member to be investigated in the measurement position. Obviously, this can only be carried out after opening the enclosure, the source then being in the retracted position 4a. In view of the fact that the source is radioactive, the obstruction of bore 12 by plug 70 ensures a biological protection against the gamma radiation emitted by it. The placing in the measuring position of member 2 is ensured by centering members 6 and 18.

The enclosure can then be sealed by unscrewing screw 56, said unscrewing leading to the unblocking of rod 10 as a result of the restoring force of spring leaf 74.

The source is then introduced into the hollow member by pushing on rod 62, to which rod 10 is fixed. The introduction of the source into the member takes place via opening 4, which can be very small, i.e. approximately 5 mm, because in the case of a cylindrical source, the diameter thereof can be approximately 2 to 3 mm and the diameter of rod 10 3 to 5 mm. Moreover, in view of the fact that the length of the source can be between 5 and 10 mm, control can take place for hollow members having a cavity depth of a few dozen mm.

Figure 4:
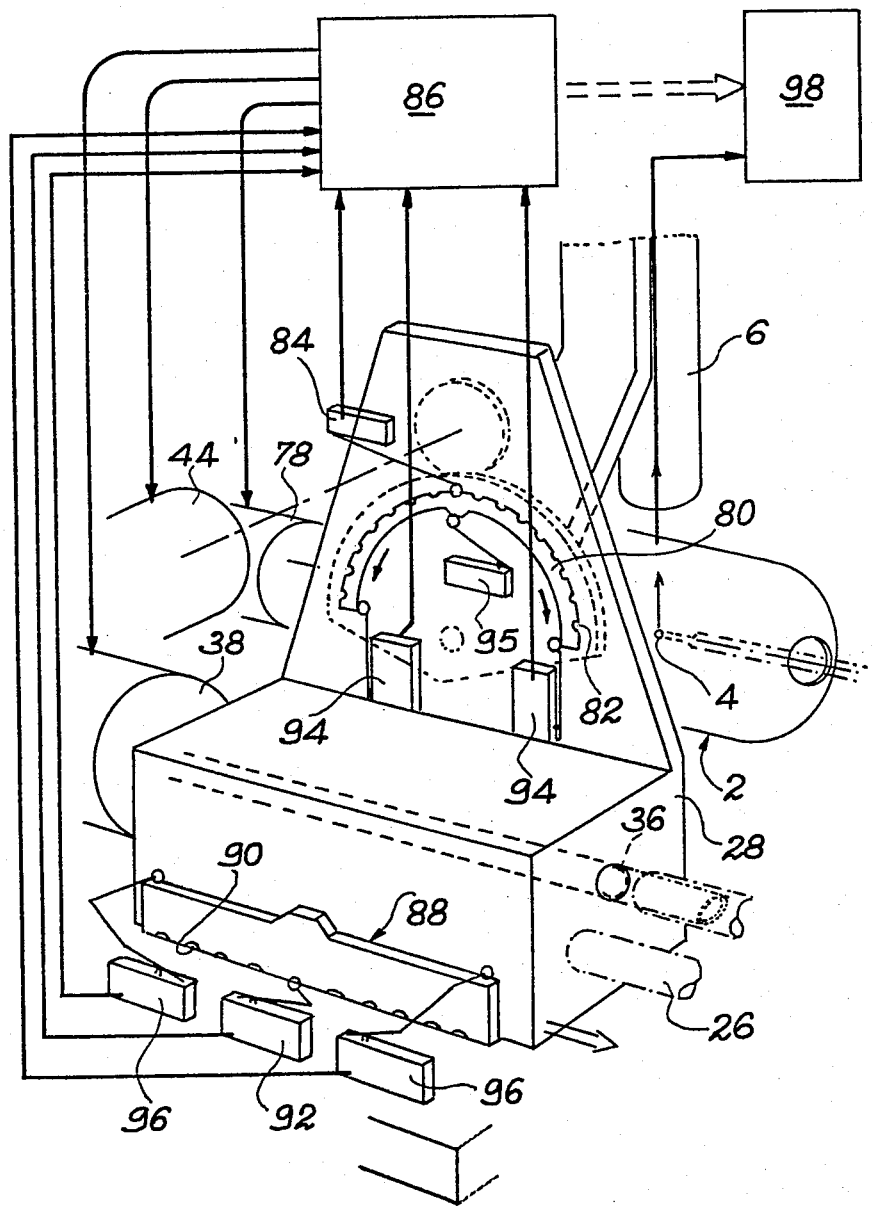
FIG. 4 diagrammatically, a perspective view of the apparatus according to the invention, which in particular illustrates the control and servocontrol means of the said apparatus.

In the case of a member having two terminal spherical parts and a central cylindrical part, as shown in the drawings, the source is placed on the axis of the part. It is firstly maintained in a fixed position in the centre of one of the spherical parts and the detector can be moved in front of the spherical part in accordance with a circular arc centered on the source via the toothed sector 40 and pinion 42 rotated by geared motor 44. An indented sector 80 (FIG. 4) makes it possible to obtain a stepwise operation, the step being a function of the distance separating two indentations 82 of the said sector. The stopping of geared motor 44 is controlled by a switch 84 mounted on carriage 28, when said switch faces an indentation. A control system 86 then ensures the performance of a measuring programme, then the starting of the geared motor 44.

When the detector is level with the central cylindrical portion of the member, a limit switch 85 controls the stopping of the geared motor 44 and a limit switch 96 controls the coming into action of geared motor 38, causing the displacement of carriage 28 by action on the threaded rod 36 and nut 34. The displacement of carriage 28, which is integral with the two guidance columns 26 mounted on arm 24 maintaining rod 10, makes it possible to simultaneously displace the source and the detector and therefore control or check the complete cylindrical part. The stepwise displacement of the carriage is ensured by means of an indented strip 88, the step being defined by the distance separating two indentations. The stopping of geared motor 38 is controlled by a switch 92 mounted on carriage 28, when said switch faces an indentation. Control system 86 then ensures the putting into effect of the measurement programme and then the starting of geared motor 38.

Finally, when the source and the detector are level with the second spherical portion, another limit switch 96 contols the stopping of geared motor 38 and switch 95 again controls the coming into action of geared motor 44, which makes it possible to inspect the member level with the said second spherical portion in the manner described hereinbefore. In particular, the source remains fixed and the stepwise displacement of the detector is ensured by means of a toothed sector 40 and pinion 42, as well as the indented sector 80. When the inspection of the latter spherical portion is at an end, a limit switch 94 controls the stopping of geared motor 44. The source and detector can be returned or not returned to their starting point, bearing in mind that the operating direction of the apparatus according to the invention is reversible.

The starting up of a geared motor 78 or the rotation of a handle 76 makes it possible, by acting on member 20, to rotate the member to be inspected in such a way as to recommence another series of measurements. The existence of indented sector 80 and indented strip 88 makes it possible to obtain precise information on the coordinates of the different areas of the member being inspected. Said sector and said strip guarantee the reproducibility of these coordinates, which is essential for the inspection of members having a varying wall thickness. The different measurements obtained can, for example, be displayed on a recording means 98.

Hitherto, consideration has been given to the control and inspection of a member by maintaining it in a given position and by displacing the detector and the source. Obviously, the apparatus also makes it possible to perform an inspection of the member, by maintaining the source and detector fixed and by rotating the member, e.g. by means of geared motor 78.

When the complete member has been inspected, the source is returned to position 4a by action of rod 62. The fixed and movable parts of the enclosure can then be disengaged, bore 12 being simultaneously obstructed by plug 70.

It should be noted that the operation and use of the apparatus have been described on the basis of a member having two spherical portions at its end and a central cylindrical portion, but it is obvious that this apparatus can be used for other types of hollow members, provided with an opening via which the gamma radiation emission source is introduced.

Measurements relating to hollow steel members having a hemispherical wall have been carried out by means of the process and apparatus according to the invention. The thickness of the wall of these members is between 5 and 10 mm.

These measurements have been carried out by means of a Co57 radioactive source having an activity of 1.4 mCi and a mTe 123 radioactive source having an activity of 0.9 mCi using a detector having a semiconductor crystal such as cadmium telluride (CdTe.). This type of detector has an adequate resolution and efficiency to ensure a separation between the different emission lines of the source, bearing in mind that the measurement must be carried out on a clearly defined energy transition. Thus, the thickness of the wall being inspected is only dependent, for a constant source - detector distance, on the absorption coefficient $\mu$, which is a constant for a given material and for a given radiation energy. Moreover, this type of detector operates at ambient temperature, which permits easy manipulation. The detector has a cylindrical shape, the diameter being 20 mm and the length 100 mm.

In the case of a mTe 123 source and a CdTe detector, the source - detector distance is 160 mm, whilst in the case of a Co57 source and a CdTe detector the distance is 170 mm.

Under such operating conditions, the accuracy obtained with respect to the thickness of the walls is close to 0.05 mm, which is much better than that obtained with the processes and apparatuses of the prior art.

In order to improve this accuracy, it is necessary to use more powerful radioactive sources, i.e. having an activity of approximately 25 mCi. Moreover, the use of a small diameter gamma photon beam would also make it possible to improve the accuracy of these measurements. It should be noted that the reduction of the diameter of the beam is linked with the increase in the activity of the source. These improvements make it possible to obtain an accuracy better than 0.05 mm for members having a thickness of 5 to 10 mm.

It should also be noted that the choice of the source and its activity are dependent on the nature of the member to be controlled, as well as the range in which the thickness of its wall varies. The replacement of one source by another can easily be carried out in view of the fact that the shielded block in which the source is mounted can be easily dismantled.

Moreover, the distance between the source and the detector, for the same member to be inspected, can be modified (screw 46) as a function of the radioactive decay of the source.

What is claimed is:

1. Apparatus for non-destructively and absolutely measuring the thickness of the wall of a hollow member, comprising:
   means for holding and positioning said member;
   a radioactive source movable into said member for emitting gamma radiation in the direction of the inner surface of said wall of said member;
   a single detector positionable outside said member so as to detect the gamma radiation passing through said wall of said member;
   said source and said detector forming an assembly;
   moving means for causing relative and continual movement between said assembly and said member, so that said assembly follows the wall profile of said member, wherein when said member has a rectilinear wall, in section, said moving means simultaneously moves the source and the detector parallel to the rectilinear wall and wherein, when said member has a circular arc-like wall, in section, said source is maintained in the center of the arc, and the detector moves along a larger radius arc centered on the source; and
   means for fixing the distance between the detector and the source, said distance remaining constant while the assembly moves.

2. An apparatus according to claim 1 wherein said movement causes the detected radiation to be constantly normal to said wall of said member.

3. An apparatus according to claim 1, further comprising a protective enclosure formed from two portions, whereof one is detachable.

4. An apparatus according to claim 1, wherein the detector is a cadmium telluride crystal.

5. An apparatus according to claim 1, further comprising a device for collimating the gamma radiation traversing the wall of the member.

6. An apparatus according to claim 1, further comprising means for automatically controlling said moving means said movement being performed in a stepwise manner.

7. An apparatus according to claim 1, further comprising a source support which can be displaced between a measuring position and a retracted position, a detector support and means for automatically joining these supports when the source support is in the measuring position.

8. An apparatus according to claim 7, wherein the source support comprises a rod, one of whose ends supports the source, said rod sliding in a bore formed in a fixed shielded block, provided with a shielding system making it possible to obstruct the bore of the block, when the rod is in the retracted position.

9. An apparatus according to claim 8, wherein the means for holding and positioning said member is constituted by a part fixed to the shielded block and a movable part, said two parts being positioned on either side of said member, the movable part being connected to means enabling the rotation of said member.

* * * * *